United States Patent [19]

Barltrop et al.

[11] 4,376,569

[45] Mar. 15, 1983

[54] ELECTROLYTE FOR AN ELECTROCHROMIC DISPLAY

[75] Inventors: John A. Barltrop, Oxford; Colin L. Bird, Eastleigh; Gilbert C. S. Collins, Southampton, all of England

[73] Assignee: International Business Machines Corporation, Armonk, N.Y.

[21] Appl. No.: 146,824

[22] Filed: May 5, 1980

[30] Foreign Application Priority Data

May 23, 1979 [GB] United Kingdom ............... 7917883

[51] Int. Cl.$^3$ ........................... G02F 1/17; C09K 3/00
[52] U.S. Cl. ................. 350/357; 252/408.1; 252/600; 252/62.2
[58] Field of Search ............... 350/357; 252/408, 600

[56] References Cited

U.S. PATENT DOCUMENTS

| | | | |
|---|---|---|---|
| 3,806,229 | 4/1974 | Schoot et al. | 350/357 |
| 3,854,794 | 12/1974 | Van Dam | 350/357 |
| 3,912,368 | 10/1975 | Ponjee et al. | 350/357 |
| 3,950,077 | 4/1976 | Jasinski | 350/357 |
| 3,961,842 | 6/1976 | Jasinski | 350/357 |
| 4,116,535 | 9/1978 | Ponjee et al. | 252/408 |
| 4,117,659 | 10/1978 | Takeshita | 350/357 |
| 4,192,581 | 3/1980 | Yaguchi et al. | 350/357 |
| 4,210,390 | 7/1980 | Yaguchi | 350/357 |
| 4,212,518 | 7/1980 | Imataki et al. | 350/357 |
| 4,285,575 | 8/1981 | Imataki et al. | 350/357 |

FOREIGN PATENT DOCUMENTS 52-5684  1/1977  Japan ................................. 252/408

OTHER PUBLICATIONS

Kawata, T. et al., Japan J. Appl. Phys., vol. 14, No. 5, pp. 725-726, (1975).

*Primary Examiner*—Teddy S. Gron
*Attorney, Agent, or Firm*—Joseph E. Kieninger

[57] ABSTRACT

An electrolyte for an electrochromic display of the kind in which a persistent colored species of an electrochromic substance in solution is deposited onto a display electrode upon the passage of current therethrough is disclosed. The electrolyte comprises an aqueous solution of a di-alkyl bipyridinium salt and a non-polymeric aliphatic alcohol in which either: (a) both alkyl groups of the bipyridinium salt have an odd number of carbon atoms and the alcohol has an even number of carbon atoms; or (b) both alkyl groups of the bipyridinium salt have an even number of carbon atoms and the alcohol has an odd number of carbon atoms. The presence of an alcohol in the electrolyte inhibits recrystallization (spotting) and non-erasure of the display electrodes. A particularly effective alcohol for 1,1' di-heptyl 4,4' bipyridinium dibromide, which has a severe lifetime problem, is n-hexanol.

12 Claims, 7 Drawing Figures

ELECTROLYTE FOR AN ELECTROCHROMIC DISPLAY

DESCRIPTION

TECHNICAL FIELD

The present invention relates to electrolytes for electrochromic displays of the kind in which a persistent colored species of an electrochromic substance in solution is deposited onto a display electrode upon the passage of current therethrough.

It is a primary object of this invention to provide an improved electrolyte for use in an electrochromic display.

It is another object of this invention to provide an electrolyte that has a long useful life.

It is yet another object of this invention to provide an electrolyte that effects a complete erasure.

It is still another object of this invention to provide an electrolyte in which recrystallization of the deposit is inhibited.

BACKGROUND ART

One class of substances which have been the subject of considerable study in recent years because of their electrochromic properties are the 4,4'-bipyridinium salts, also known as "viologens." These salts have the general formula:

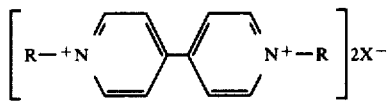

where R is a substituent group and $X^-$ is any appropriate anion. Several of these salts are colorless in solution but upon passage of a current between electrodes are electrochemically reduced and deposited as a violet film upon the cathode. The electrochemical reaction is reversible thus permitting erasure and rewriting of electrodes in a display application.

One viologen of particular interest because of the intensity and fastness of its color when reduced is 1,1'-di-n-heptyl 4,4'-bipyridinium dibromide, (for which, referring to the above structural formula, R is $n-C_7H_{15}$ and X is Br). However, display cells containing this substance (which will be referred to more concisely as di-heptyl viologen bromide) have been found to have only a short useful life because of spotting and non-erasure of the display electrodes after relatively few write/erase cycles. These problems are discussed in a paper by J. Bruinink et al. (J Electrochem Society December 1977 pp 1854–1858) which attributes them to recrystallization of the deposit. The paper concluded that modified viologens with polymethylene-linked bipyridinium rings and with tetrafluoroborate or perchlorate anions were more promising than di-heptyl viologen bromide for electrochromic displays.

U.S. Pat. Nos. 3,950,077 and 3,961,842 also discuss the so-called "hysteresis" effect or spotting of diheptyl viologen bromide after relatively few cycles and attribute this to the bromide anions. These patents propose, inter alia, that a dihydrogenphosphate anion be substituted for the bromide anion to increase the useful life of the display.

In U.S. Pat. No. 4,117,659, it is proposed that the lifetime of a di-heptyl viologen bromide electrochromic display, which is limited by the onset of incomplete erasure, can be extended by the inclusion of a pH buffer in the solution.

In published German patent application OLS No. 2,814,824 the lifetime of an electrochromic display employing any of a large number of viologens including 1,1'-di-heptyl-4,4'-bipyridinium dibromide is stated to be extended by adding a "complexion," preferably a metal chelate to the solution, which may be an aqueous or a methanol solution.

The prior art includes many other examples of di-alkyl bipyridinium salts as electrochromic substances in solution which do not mention problems of non-erasure. The prior art documents reveal additives or traces in many of these solutions, but no effect upon recrystallization or non-erasure is mentioned.

BRIEF DESCRIPTION OF THE DRAWINGS

In the accompanying drawings forming a material part of this disclosure.

DISCLOSURE OF THE INVENTION

Figure 1:
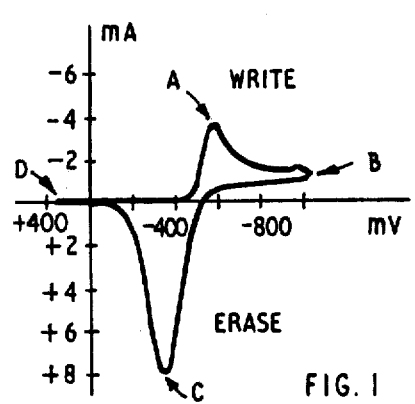
FIG. 1 is a cyclic voltammogram for the heptyl viologen bromide solution of comparative Example 1, taken after two or three cycles.

For further understanding of the invention and of the objects and advantages thereof, reference will be had to the following description and accompanying drawings, and to the appended claims in which the various novel features of the invention are more particularly set forth.

The prior art has recognized a cell lifetime problem with electrochromic displays employing di alkyl bipyridinium salts, particularly 1,1' di-heptyl-4,4' bipyridinium dibromide.

The present invention derives from discovery that certain alcohols inhibit recrystallization of deposited viologen on display electrodes and provides an electrolyte for an electrochromic display of the kind in which a persistent colored species of an electrochromic substance in solution is deposited onto a display electrode upon the passage of current therethrough, the electrolyte comprising an electrochromic di-alkyl bipyridinium salt and a non-polymeric aliphatic alcohol both in aqueous solution where either:

(a) both the alkyl groups of the bipyridinium salt have an odd number of carbon atoms and the alcohol has an even number of carbon atoms; or (b) both the alkyl groups of the bipyridinium salt have an even number of carbon atoms and the alcohol has an odd number of carbon atoms.

It is preferred that the alcohol should be a primary alcohol. In such systems, non-erasure of the display electrode is inhibited as well as recrystallization. Preferably, the odd and even numbers of carbon atoms differ by 1.

In the case of 1,1'-di-heptyl-4,4' bipyridinium dibromide the most effective alcohol is n-hexanol. n-butanol and n-octanol are also effective.

Preferably the concentration of alcohol is in the range of half to full saturation concentration.

The invention also provides an electrochromic display cell comprising an array of display electrodes, a counter electrode and an electrolyte as specified above.

Non-polymeric aliphatic alcohols are not mentioned in the prior art as additives to aqueous electrolytes containing di-alkyl bipyridinium salts nor is there any suggestion that such additives will have a beneficial effect on recrystallization or non-erasure and thus lifetime of a display cell.

DETAILED DESCRIPTION OF THE INVENTION

The performance and lifetime of electrolytes for electrochromic displays is most readily tested in a test cell by the method of cyclic voltammetry. One such cell, which has been employed to perform tests upon various electrochromic electrolytes both according to and outside the present invention, consists of a vessel having a 0.2 cm$^2$ platinum working electrode, a large area platinum foil counter electrode and a saturated KCl/Calomel reference electrode.

The method of cyclic voltammetry involves cycling the potential of the working electrode with respect to the reference electrode between predetermined limits. The potential is altered linearly and the current which flows between the counter and working electrodes is monitored. By choosing appropriate potential limits the cycle can be made to correspond to a typical write/erase cycle of a display electrode.

A cyclic voltammogram (CV) for a cell containing a 0.1 molar solution of heptyl viologen dibromide and 0.2 molar potassium bromide in aqueous solution is shown in FIG. 1. This CV was taken after only two or three cycles before any aging effects could occur. The cathodic peak A of the CV corresponds to the electrochemical reduction of the viologen radical cation at the working electrode. Writing the cation as V$^{++}$ for convenience the peak corresponds to the single electron reduction

$$V^{++} + e^- \rightarrow V^+. \quad (1)$$

This step is followed by an immediate chemical reaction with the bromide anions:

$$V^+ + Br^- \rightarrow VBr \downarrow \quad (2)$$

so that a viologen bromide precipitate forms on the electrode.

For practical display applications, the potential is kept more positive than that needed to further reduce the singly ionized viologen as the two electron reduction is not readily reversible, leaving a non-erasable product, which may be colored, on the electrode. A small second cathodic peak near to point B in FIG. 1 corresponds to the beginning of this second reduction. The first reduction commences at a certain threshold potential and current increases rapidly as the electroactive species in the immediate vicinity of the electrode is reduced. After this, the current falls off to a level determined by the rate of mass transport in the solution.

The write portion of the cycle is followed by an erase portion in which the potential of the working electrode is linearly increased. Current flow decreases gradually to zero, at approximately the same threshold potential, and then sharply reverses as the electrochemical reduction is reversed. An anodic peak C is produced, corresponding to maximum erase current, the current decreasing in magnitude to zero, at point D, as all the deposited viologen bromide is stripped from the working electrode.

Figure 2:
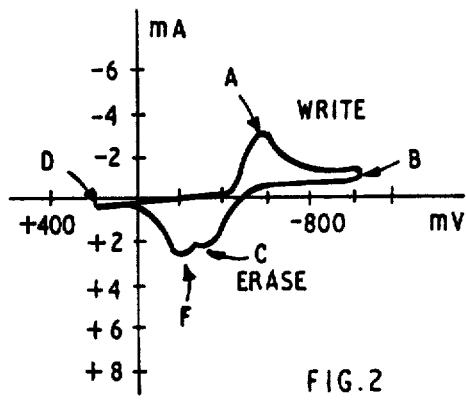
FIG. 2 is a cyclic voltammogram for the same solution of comparative Example 1, taken after approximately 100 cycles.

FIG. 2 shows a cyclic voltammogram (CV) taken after around 100 write/erase cycles have been performed. It will be noted that the CV of FIG. 2 has smaller peaks A and C than the CV of FIG. 1.

More significant features for an understanding of the problem solved by the present invention are the appearance of a second erase peak F and the fact that current is still passing at point D, the end of the erase cycle. The appearance of the second peak F is thought to be a recrystallization phenomenon linked with visually observed spotting of the electrodes with non-erasable deposit. It is believed that immediately after being written, the initial deposit is in a quasi-liquid state and later recrystallizes into a thermodynamically more stable structure indicated by peak F. The failure of the current to return to zero at D indicates that there is still deposit on the working electrode. This effect is linked with overall non-erasure of the working electrode.

According to the present invention it has been discovered that certain alcohols are effective in inhibiting recrystallization and, in many cases, non-erasure also.

Cyclic voltammetric experiments have been performed in a test cell of the type described above on both di-n-heptyl and di-n-hexyl bipyridinium dibromide in aqueous solution with potassium bromide to which various alcohols have been added. Concentrations of the bipyridinium salt ranged from 0.025 Molar to 0.15 Molar. Concentrations of potassium bromide were in the range of 0.2 Molar to 0.3 Molar.

Alcohols added included n-butanol, n-hexanol, n-octanol, n-pentanol and n-heptanol all of which had a beneficial effect with one or other of the viologens. The effect appears to be steric in that odd chain length alcohols inhibit recrystallization and non-erasure in even chain length viologens but even chain length alcohols have no beneficial effect. Conversely, even chain length alcohols inhibit recrystallization and non-erasure in odd chain length viologens but odd chain length alcohols have no beneficial effect. The beneficial effects are most marked when the chain length of the alcohol differs by 1 from the chain length of the viologen. Thus n-hexanol is particularly effective with di-n-heptyl bipyridinium dibromide whereas n-pentanol is most effective with di-n-hexyl bipyridinium dibromide.

The concentrations of alcohol used ranged right up to saturation level (35 gms/liter for n-butanol, 3 gms/liter for n-hexanol). The inhibition effect is concentration dependent; the higher the concentration of inhibitor, the better the effect. However, there is a concentration limitation in the miscibility of the inhibitor with water and the tendency of the system to form foams.

Besides the primary alcohols mentioned above, certain other alcohols were found to prevent recrystallization, as demonstrated by the non-appearance of the second peak F in the cyclic voltammogram even after a large number of cycles. Cyclohexanol was found to inhibit recrystallization in electrolytes containing di-n-heptyl bipyridinium dibromide as the electrochromic substance. However, non-erasure, as evidenced by a non-zero current "tail" at point D of the cyclic voltammograms was not prevented. 2-methyl-pentan-2-ol was found to inhibit recrystallization in electrolytes containing di-n-hexyl-bipyridinium dibromide as the electrochromic substance but, again, non-erasure was not prevented.

In the experiments conducted, the cells were cycled between limits lying within the range +200 mV and −1000 mV with respect to the reference electrode at ramps of 0.1-1.2 volts/sec. Cyclic voltammograms were taken after various numbers of cycles up to a maximum of 200,000.

Experiments have been carried out, not only in test cells as described above, but also in test cells employing tin doped indium oxide electrodes. Cycling experiments have also been carried out in an actual display cell employing an 8×8 array of platinum display electrodes which could be selectively written by means of constant current drivers. Up to 100,000 cycles of such a display cell, containing n-hexanol as an additive to a heptyl viologen bromide electrochromic, were performed without any sign of non-erasure.

Besides the alcohols discussed above, several other alcohols and organic compounds were investigated but found to be ineffective in preventing recrystallization or non-erasure for both di-n-heptyl and di-n-hexyl bipyridinium dibromide. Ineffective alcohols were polyvinyl alcohol and benzyl alcohol. Amines found to be ineffective were ethanolamine, triethanolamine and n-butylamine.

The invention will now be described further with reference to the following examples of electrolytes according to the invention. Comparative examples outside the invention are also included.

COMPARATIVE EXAMPLE 1

An aqueous solution of 0.1 M 1,1' di-heptyl 4,4'-bipyridinium dibromide and 0.2 M potassium bromide was made up and introduced into a test cell. The cell had a 0.2 cm² platinum working electrode, a large area platinum foil counter electrode, previously cleaned by electrochemical cycling in sulphuric acid, and a saturated KCl/Calomel reference electrode. The solution was thoroughly deoxygenated by bubbling nitrogen through the cell for 15 minutes prior to testing and then passing it continuously over the solution.

The working electrode potential with respect to the reference electrode was then cycled between +200 mV and −1000 mV at a rate of 1 volt/sec to cause repeated deposition and erasure of the heptyl viologen bromide on the working electrode. The current passing through the cell was monitored and recorded to give a cyclic voltammogram. After only a few cycles the CV was as shown in FIG. 1 indicating good erasure. After approximately 100 cycles the CV was as shown in FIG. 2 indicating recrystallization (point F) and non-erasure (point D).

EXAMPLE 1

Figure 3:
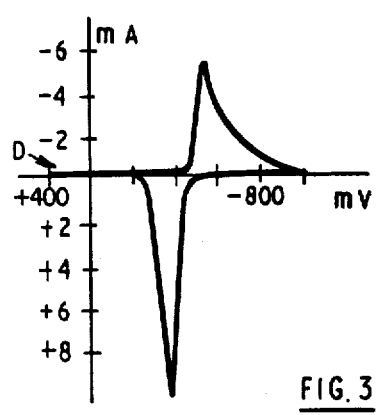
FIG. 3 is a cyclic voltammorgram for the heptyl viologen bromide solution including N-hexanol of Example 1, taken after a few thousand cycles.
Figure 4:
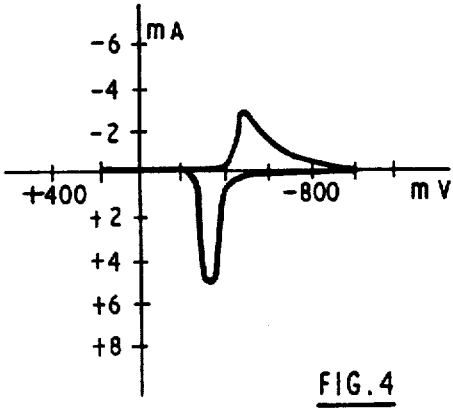
FIG. 4 is a cyclic voltammogram for the same solution of Example 1, taken after 100,000 cycles.

A saturated solution of n-hexanol in water was made up and potassium bromide was dissolved therein to 0.2 M concentration. Sufficient n-heptyl bipyridinium dibromide was added to give a 0.1 M concentration but the solution foamed with the viologen would not dissolve. Addition of an equal volume of 0.2 M potassium bromide eventually dissolved the viologen and produced a solution of the following composition:

0.05 M—n heptyl bipyridinium dibromide
0.2 M—potassium bromide
(50% saturated)—n-hexanol This solution was introduced into the test cell of Comparative Example 1 and deoxygenated in exactly the same manner. The cell was then similarly cycled from +200 mV to −1000 mV at a rate of 1 volt/sec for 100,000 cycles. FIG. 3 shows a typical CV after a few thousand cycles and FIG. 4 shows a CV after 100,000 cycles. In neither case was there any sign of recrystallization or non-erasure. The fall in write and erase currents began after approximately 40,000 cycles and was probably due to a colorless deposit which formed on the electrode at about this time. Contrast was little affected by this deposit which could be removed by wiping.

EXAMPLE 2

The experimental procedure of Example 1 was repeated with solutions containing the same components but in different concentrations.

Solutions of di-heptyl bipyridinium dibromide ranging in concentration from 0.05 M to 0.13 M and including n-hexanol at half its saturation concentration (i.e. 1.5 gm/liter) were cycled up to 200,000 times without spotting or non-erasure occurring.

There was a tendency to the formation of minute black spots at concentrations of di-heptyl bipyridinium dibromide in excess of 0.07 Molar after about 40,000 cycles. These are possibly thermodynamically more stable (recrystallized) form of the viologen and were easily redissolved by standing the solution at +200 mV ref SCE for a few minutes.

Saturation levels of n-hexanol (3 gm/liter) were achieved in some solutions without foaming by adding more potassium bromide but the solution tended to form blue black crystals of the more stable form on the electrode.

It was concluded that the optimum heptyl viologen/n-hexanol solution was that of Example 1.

EXAMPLE 3

Solutions of di-heptyl bipyridinium dibromide of various concentrations were saturated with n-butanol, which proved to be readily soluble without causing foaming. These solutions were introduced into the cell described in Comparative Example 1 and deoxygenated in the same manner. Cyclic voltammograms were produced under the same conditions as for Examples 1 and 2 and the cell was cycled 90,000 times with no sign of spotting or non-erasure. The coloration of the deposit however was somewhat translucent. There was no tendency to produce the thermodynamically stable form of the precipitate. The optimum solution composition was:

0.1 M—di heptyl bipyridinium dibromide
0.2 M—potassium bromide
35 g/liter (saturation)—n-butanol

EXAMPLE 4 n-Octanol was added dropwise to an aqueous solution of di-heptyl bipyridinium dibromide and dissolved therein, though it proved only sparingly soluble. The resulting solution composition was:

0.1 M—di-heptyl bipyridinium dibromide
0.2 M—potassium bromide
(saturation)—n-octanol The solution was introduced into the cell described in Comparative Example 1 and deoxygenated in the same manner. Cyclic voltammograms were produced under the same conditions as for Examples 1 and 2 and the cell was cycled 6300 times with no sign of spotting or non-erasure.

EXAMPLE 5

A quantity of the tertiary alcohol 2-methyl-pentan-2-ol was dissolved in an aqueous solution of di-heptyl bipyridinium dibromide to give a solution of composition:

0.1 M—di-heptyl bipyridinium dibromide
0.2 M—potassium bromide
(saturated)—2-methyl-pentan-2-ol The solution was introduced into the cell described in Comparative Example 1 and deoxygenated in the same manner.

Cyclic voltammograms were produced under the same conditions as for Examples 1 and 2 and the cell was cycled a number of times.

This solution exhibited no recrystallization peak F in its CVs, but non-erasure was visually observed within 200 cycles.

EXAMPLE 6

Sixteen drops of cyclohexanol (about 0.8 ml) were added to 30 ml of an aqueous solution of di-heptyl-bipyridinium dibromide and potassium bromide of the same composition as in Comparative Example 1. The solution was introduced into the cell described in Comparative Example 1 and deoxygenated in the same manner. Cyclic voltammograms were produced under the same conditions as for Examples 1 and 2 and the cell was cycled a number of times.

This solution exhibited no recrystallation peak F in its CVs, but non-erasure was visually observed within 200 cycles.

COMPARATIVE EXAMPLE 2

An aqueous solution of 0.1 Molar 1,1' di-hexyl 4,4' bipyridinium dibromide and 0.2 Molar potassium bromide was made up and introduced into a test cell as described in Comparative Example 1. The solution was deoxygenated in the same manner as for Comparative Example 1.

The working electrode potential with respect to the reference electrode was then cycled between +200 mV and −1000 mV at a rate of 1 volt/sec to cause repeated deposition and erasure of the hexyl bipyridinium dibromide on the working electrode. The current passing through the cell was monitored and recorded to give a cyclic voltammogram. After a number of cycles the CV was as shown in FIG. 5.

Figures 5, 6, 7:
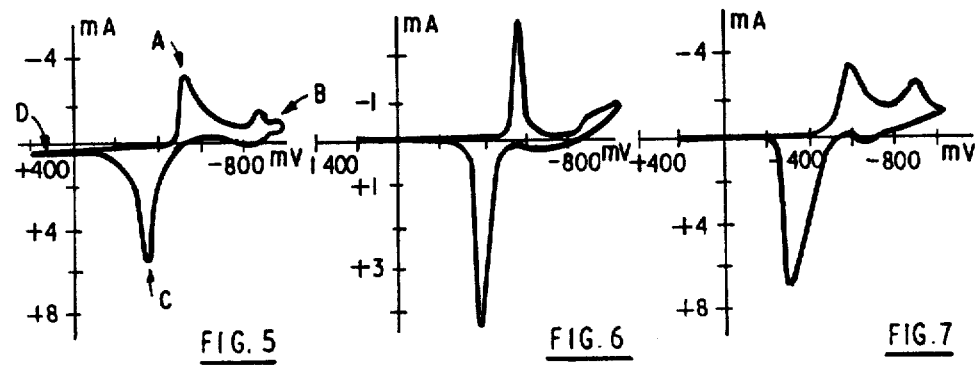
FIG. 5 is a cyclic voltammogram for the hexyl viologen bromide solution of comparative Example 2.
FIG. 6 is a cyclic voltammogram of the hexyl viologen bromide solution including 0.1 ml of N-pentanol of Example 7.
FIG. 7 is a cyclic voltammogram of the hexyl viologen bromide solution including 1 ml of N-pentanol of Example 7.

The CV of FIG. 5 shows no recrystallization but does exhibit non-erasure (point D).

EXAMPLE 7 n-Pentanol was added to the solution of Comparative Example 2 in amounts varying from 0.1 ml up to saturation (3 g/l).

Cyclic voltammograms were taken as for Comparative Example 2 and recrystallization and non-erasure were found to be inhibited for at least 40,000 cycles. A CV of the solution with 0.1 ml of n-pentanol is shown in FIG. 6 and a CV of the solution with 1 ml of n-pentanol is shown in FIG. 7. The deposit was more resistive in the CV of FIG. 6 than in that of FIG. 7. The difference in shape of the two CVs of FIGS. 6 and 7 is probably attributable to the solubilizing effect of a greater concentration of alcohol.

Fully saturated n-pentanol solutions gave strong colours and erased well but blue black crystals of the stable radical cation precipitate formed all over the working electrode within 8000 cycles.

The optimum solution composition was:
0.1 M—di-hexyl bipyridinium dibromide
0.2 M—potassium bromide
1.5 g/l—n pentanol This solution underwent more than 30,000 cycles without degradation.

COMPARATIVE EXAMPLE 3

An aqueous solution of 0.5 Molar di-heptyl bipyridinium dibromide and 0.2 Molar potassium bromide was introduced into a test cell. The cell working electrode was a tin doped indium oxide coating on glass, commercially known as Nesatron, the counter electrode was platinum foil and the reference electrode was a standard calomel electrode.

The potential of the working electrode relative to the reference electrode was cycled between +200 mV and −800 mV at a rate of 0.1 volt/sec. On this severe cycle, spotting was observed visually after only 5 cycles. This became extensive and the written deposit was observed to have two colors after 30 cycles.

EXAMPLE 8 n-Hexanol was added to the solution of Comparative Example 3 to 50% saturation level and the experiment was repeated. The working electrode colored evenly and erased well for 250 cycles. At this stage minute spots were seen but were all located along a fault in the Nesatron glass coating.

The experiment was repeated again with a rate of 1 volt/second. There was no sign of spotting after 3000 cycles.

EXAMPLE 9

An aqueous solution of di-heptyl bipyridinium dibromide (0.127 M), potassium bromide (0.2 M) and n-hexanol (50% saturation) was made up and introduced into a display cell having an 8×8 array of platinum display electrodes, each 0.0625 cm² in area and each selectively connectable to a constant current source. The counter electrode was platinum black and the reference electrode was a silver wire adjacent to the display electrodes.

The display was cycled 100,000 times, writing a predetermined fixed pattern, as follows: an 8 mS constant current write period was followed by a 50 mS hold period, a 250 mS erase period and a 50 mS off period. Each 8 mS constant current write period was effective to deposit 2 mC/cm² of charge (viologen) upon a display electrode. The erase was effected potentiostatically with reference to the silver wire electrode. No sign of non-erasure could be observed visually. Photopic measurements of the contrast ratio between the written and unwritten display electrodes gave a contrast ratio of 2.36 to 1 which was the same as observed without the presence of n-hexanol.

While we have illustrated and described the preferred embodiments of our invention, it is understood that we do not limit ourselves to precise steps herein and the right is secured to allow changes and modifications coming within the scope of the invention as defined in the appended claims.

We claim:

1. An electrolyte for an electrochromic display of the kind in which a persistent colored species of an electrochromic substance in solution is deposited onto a display electrode upon the passage of current therethrough, the electrolyte comprising an electrochromic di-alkyl bipyridinium salt and a non-polymeric monohydric aliphatic alcohol, both in aqueous solution, taken from the group consisting of a and b where
   (a) both alkyl groups of the bipyridinium salt have seven carbon atoms and the alcohol has and even number of carbon atoms; and
   (b) both alkyl groups of the bipyridinium salt have six carbon atoms and the alcohol has an odd number of carbon atoms.

2. An electrolyte as claimed in claim 1 in which the alcohol is a primary alcohol.

3. An electrolyte as claimed in claim 1 in which the electrochromic salt is a 1,1'-di-n-alkyl-4,4' bipyridinium dibromide.

4. An electrolyte as claimed in claim 1 in which the electrochromic salt is 1,1'-di-heptyl-4,4' bipyridinium dibromide.

5. An electrolyte as claimed in claim 1 in which the odd and even numbers of carbon atoms differ by 1.

6. An electrolyte as claimed in claim 1 in which the alcohol is n-hexanol.

7. An electrolyte as claimed in claim 6 in which the concentration of n-hexanol is half its saturation concentration.

8. An electrolyte as claimed in claim 7 in which the concentration of the electrochromic salt is 0.05 M.

9. An electrolyte as claimed in claim 4 in which the concentration of the electrochromic salt is 0.1 M and the alcohol is n-butanol in saturation concentration.

10. An electrolyte as claimed in claim 1 wherein the alcohol is cyclo-hexanol.

11. An electrolyte as claimed in claim 1 wherein the alcohol is 2-methyl-pentan-2-ol.

12. An electrochromic display cell comprising an array of display electrodes, a counter electrode and an electrolyte as claimed in claim 1.